Patented Oct. 10, 1939

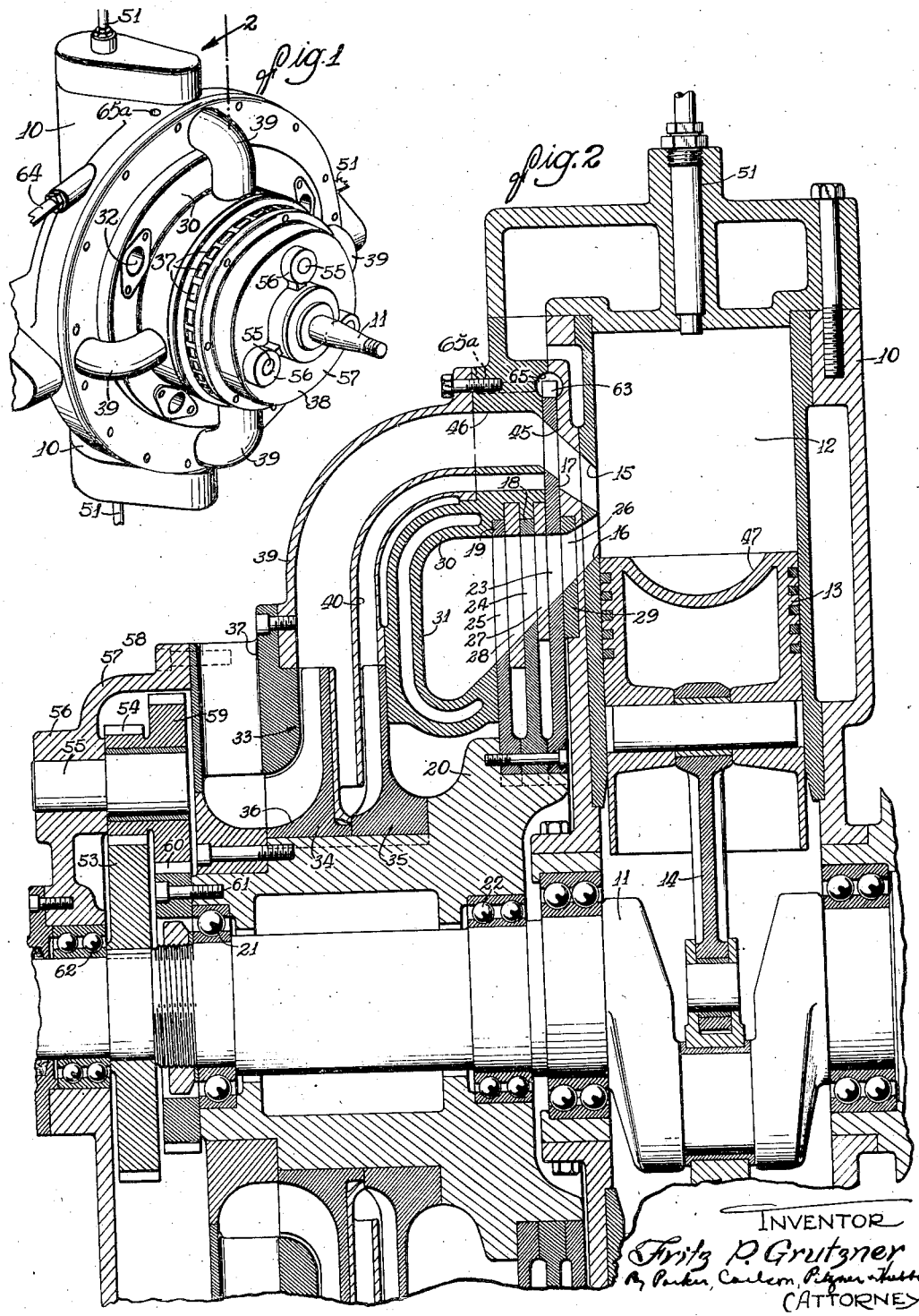

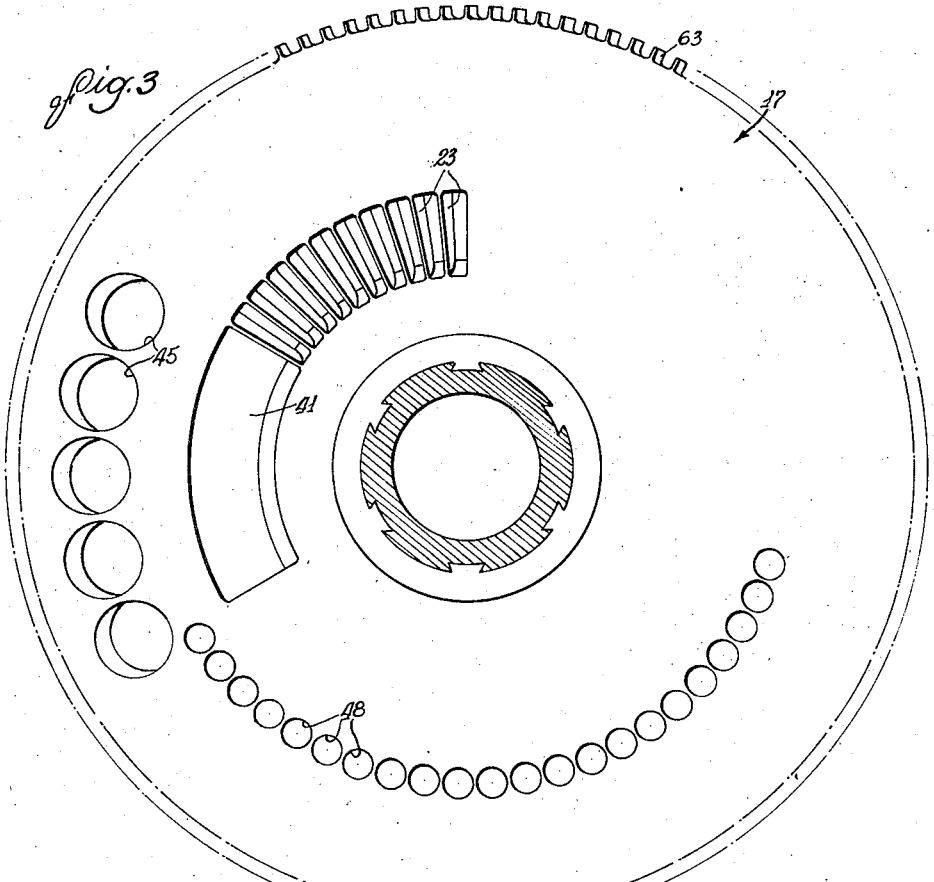
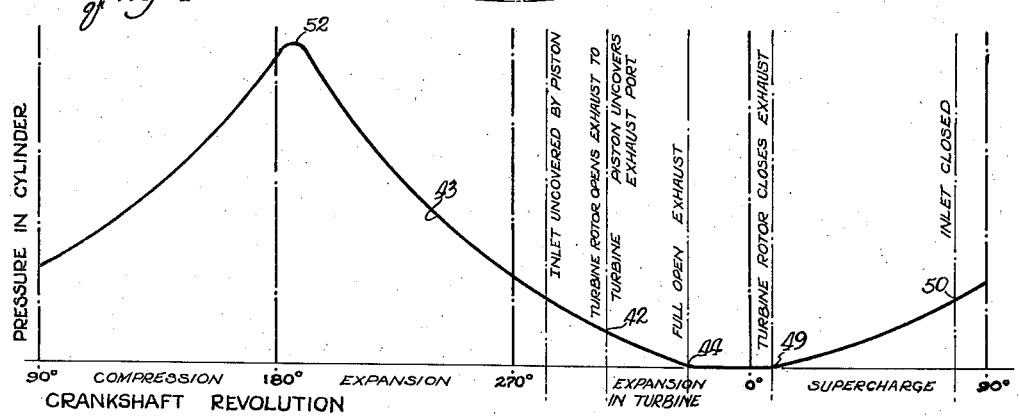

2,176,021

UNITED STATES PATENT OFFICE 2,176,021

EXHAUST GAS TURBINE FOR COMBUSTION ENGINES

Fritz P. Grutzner, Beloit, Wis.

Application September 19, 1936, Serial No. 101,607

6 Claims. (Cl. 60—13)

My invention relates to internal combustion engines.

Internal combustion engines of either the two or four cycle type are relatively inefficient irrespective of the type of fuel used because of the large amount of potential energy rejected in the exhaust gases. That is, in either gasoline, Diesel, or semi-Diesel engines, the exhaust gases leave the combustion chamber at a substantial pressure and at a temperature of approximately 1400° F. This potential energy is usually entirely wasted in the exhaust. It has heretofore been proposed to utilize a rotary compressor, commonly known as a supercharger, to supply air under pressure to the combustion chambers of engines in order to increase the power output thereof and these devices have found particular utility in airplanes since the supercharger compensates for the decrease in atmospheric pressure at high altitudes. It has been proposed to utilize a turbine, driven by the exhaust gases of the engine, to drive the supercharger and to that limited extent some use has been made of the potential energy of the exhaust gases.

It is an object of my invention to provide an improved arrangement for utilizing the exhaust gases from an internal combustion engine to drive a turbine rotor which may be operatively connected either to a supercharger or the like or to the engine crank shaft or to both, depending upon the requirements of the particular installation, and which is adapted to utilize a maximum amount of the potential energy of the exhaust gases thus increasing the overall efficiency of the engine.

More specifically, it is an object of my invention to provide an internal combustion engine having a turbine rotor provided with blades adapted to register with the exhaust ports of the engine cylinders so that the pressure and temperature drop in the gases between the combustion chamber and the turbine blades will be minimized.

It has not been possible to use the exhaust gas turbines previously available with two cycle internal combustion engines because the back pressure imposed on the exhaust by pressure of the gases in the conduits leading to the turbine precluded efficient scavenging of the combustion chamber. In accordance with my invention, however, I utilize the potential energy in the exhaust gases during the pre-exhaust period but prevent restriction of the flow of gas during the scavenging period.

It is a further object of my invention to provide an improved exhaust gas turbine which is especially adapted for use with a two cycle internal combustion engine in that the back pressure imposed on the exhaust gases leaving the combustion chamber is minimized, although it may be also efficiently used with a four cycle internal engine.

More specifically, it is an object of my invention to provide an improved exhaust gas turbine having a rotor with an aperture formed therein which is arranged to communicate with the exhaust ports of the engine cylinders during a part of the open periods thereof so that a major portion of the exhaust gases are directed to the turbine blades while the remainder are directed to the aperture in the turbine rotor thus effecting a free passage to the atmosphere of the remainder of the exhaust gases so that the cylinders are effectively scavenged.

Further objects and advantages of my invention will become apparent as the following description proceeds and the features of novelty which characterize my invention are pointed out with particularity in the claims annexed to and forming a part of this specification.

For a better understanding of my invention, reference may be had to the accompanying drawings in which Figure 1 is a perspective view of a radial type internal combustion engine embodying my invention.

Fig. 2 is an enlarged sectional view along the line 2—2 in Fig. 1 of the upper portion of the engine shown therein.

Fig. 3 is an enlarged plan view of one of the exhaust gas turbine rotors included in the engine shown in Figs. 1 and 2.

Fig. 4 is a diagrammatic representation of the changes in pressure of the gases within the cylinders of the engine shown in Fig. 1.

In the exemplary form shown in Fig. 1 of the drawings, my invention is embodied in a four cylinder radial type two cycle Diesel engine. It will become apparent as the following description proceeds, however, that my invention is applicable in its broader aspects not only to two cycle engines but also to four cycle engines irrespective of the particular cylinder arrangement, or to the type of fuel used, that is gaseous, liquid or solid.

The engine shown in Figs. 1 and 2, which exemplifies my improved construction, is provided with cylinders 10 radially disposed about a common crank shaft 11. A combustion chamber 12 is formed in each of the cylinders 10 and pistons 55

13 are reciprocable therein. The pistons 13 are connected to the crank shaft 11 by the connecting rods 14. All of the cylinders are substantially identical in construction and consequently only one of them needs be described with particularity. The cylinder 10 shown in Fig. 2 is provided with intake ports 15 and exhaust ports 16 formed in the side walls thereof adjacent the level of the top of the piston 13 when in its lowermost position. The opening and closing of the intake and exhaust ports 15 and 16 are thus controlled by the piston 13, which is movable across the open inner ends of the ports.

The gaseous products of combustion discharged from the combustion chamber 12 through the exhaust port 16 pass to the blades of an exhaust gas turbine rotor, which are disposed in direct registration with the outer end of the exhaust port. In general, the exhaust gas turbine may be freely rotatable with respect to the engine crankshaft and arranged to drive a scavenging pump or supercharger, the turbine may be directly connected to the crank shaft and turn in timed relation thereto at the same or a multiple speed, or the timing may be such that the exhaust ports are closed by the turbine during the upstroke of the piston to obtain any degree of supercharging desired. In the particular construction illustrated, a multistage turbine has been shown which is provided with rotors 17, 18 and 19. These rotors are rigidly secured to a sleeve 20 which surrounds the crank shaft 11. It will be noted that the sleeve 20 is journaled on anti-friction bearings 21 and 22 surrounding the outwardly extending portion of the crank shaft. The rotors 17, 18 and 19 are provided with registering radially disposed segmental shaped groups of blades or buckets 23, 24 and 25 respectively. The exhaust gases discharged from the port 16 are directed successively through the blades 23, 24 and 25 in series by stationary blades or nozzles 26, 27 and 28 respectively. The stationary nozzles 26 are carried by a segmental insert 29 mounted in a recess formed in the side wall of the cylinder 10 surrounding the exhaust port. The nozzles 27 and 28 are supported at their outer ends on an exhaust gas casing member 30 which is rigidly secured to the side of the cylinder 10. An annular exhaust gas manifold 31 is formed within the casing 30 adapted to receive the gases discharged from the blades of the turbine. Suitable mufflers or other conduits may be secured to the outlets 32 (Fig. 1) of the chamber 31 in order to convey the exhaust gases away from the engine.

It will thus be seen that in the arrangement illustrated, the exhaust gases pass directly from the exhaust ports of each cylinder to the adjacent blades of an exhaust gas turbine, which are arranged in direct registry with the ports. As a consequence, there is a minimum of pressure or temperature loss in the gaseous products of combustion before they reach the blades of the turbine where they are utilized to perform useful work. In a radial type engine, the exhaust ports for each of the cylinders are preferably arranged in a common plane and spaced equidistant from the axis of the crank shaft. With such an arrangement of the exhaust ports, the turbine rotor may be mounted concentrically with respect to the crank shaft and the blades thereof brought successively into register with the exhaust ports of all of the cylinders so that impulses are imparted to the turbine rotor by exhaust gases from successive cylinders.

The exhaust gas turbine described above is preferably utilized to drive a centrifugal compressor or supercharger, which supplies air under pressure to the intake ports 15 of the engine. Referring to Fig. 2, it will be seen that a multistage centrifugal compressor designated generally by the numeral 33 is provided with impellers 34 and 35 which are rigidly mounted on the sleeve 20. Air enters the radially extending recesses 36 formed in the rotor 34 through inlets 37 formed in a cup-shaped casing 38. Compressed air discharged from the first stage or rotary impeller 34 of the compressor enters a series of discharge conduits 39 terminating adjacent the intake ports 15. As is hereinafter described in greater detail, a portion of the air discharged from the impeller 34 is admitted to the combustion chamber 12 to scavenge the same. Another portion of the air discharged from the impeller 34, however, passes through the lower portion of the conduit 39 into the second impeller 35. The compressed air discharged from the second impeller 35 passes through a passage 40, formed between the adjacent walls of the conduit 39 and exhaust casing 30, through which it is conveyed to the intake port 15 and utilized to supercharge the engine.

In general, the cycle of operation for the improved apparatus herein disclosed consists of periodically introducing a combustible fuel and air into the engine combustion chamber, compressing and exploding the fuel and air in the combustion chamber, directing a major portion of the gaseous products of combustion into the exhaust case turbine, and discharging the remainder of the gaseous products of combustion directly into the atmosphere. This remaining portion of the exhaust gases is preferably discharged to the atmosphere under pressure of fresh air admitted to the combustion chamber from a supercharger or pushed out by the piston on its exhaust stroke in a four cycle engine. This cycle of operation is particularly advantageous for two cycle combustion engines since very efficient scavenging of the cylinder may be effected by discharging the air directly to the atmosphere.

In order that the exhaust gases discharged from the engine may be sequentially directed to the exhaust gas turbine blades and directly to the atmosphere, an improved form of turbine rotor has been utilized. As best shown in Fig. 3, the rotor 17 is provided with a segmental-shaped group of radially disposed blades 23, which are adapted successively to register directly with the exhaust ports 16 of the cylinders 10. In addition, a segmental opening or slot 41 has been formed in the rotor 17 which is also positioned successively to register with the exhaust ports 16. Consequently, when the exhaust ports 16 are first uncovered by the pistons 13, near the end of the power strokes thereof, the exhaust gases are directed by the nozzles 26 against the blades 23. The pressure of the exhaust gas at such time is indicated by point 42 on pressure curve 43 in Fig. 4. The exhaust gases continue to impinge on the blades 23 during the succeeding rotary movement of the turbine rotor 17 until the leading edge of the slot 41 comes into register with the exhaust port 16, at which time the pressure of the exhaust gases has dropped to practically atmospheric pressure as indicated by point 44 on curve 43. The rotors 18 and 19 are provided with corresponding open segmental slots so that the remaining portion of the exhaust gas has a free and unobstructed passage to the atmosphere. At the same time the slot 41 comes into register with the exhaust port 16, however, apertures 45 in the rotor 17 are brought into register with the adjacent ends of a passage 46 in the cylinder wall 10 and with the intake port 15. Scavenging air under pressure from the first impeller 34 of the compressor is thus supplied through the conduit 39, passage 46, and apertures 45 to the intake port. This air is directed into the combustion chamber 12 and scavenges the same thoroughly of any remaining products of combustion. A recess 47 formed in the top of the piston provides a sufficient clearance volume to receive the compressed mixture of air and fuel at the end of the compression stroke. It should be noted that the apertures 45 may be located either at a greater or lesser distance from the axis of the turbine rotor than the blades depending upon the particular construction desired.

Upon further rotation of the rotor 17 the slot 41 and apertures 45 are moved out of register with the exhaust and intake ports respectively, and a series of apertures 48 in the rotor 17 is brought into register with the intake port 15 as indicated by the point 49 on curve 43. Air is then supplied under pressure from the second stage of the compressor 33 through the passage 40 and apertures 48 to the intake port 15, the exhaust port being closed by the solid portion of the turbine rotor. Since the exhaust port is closed, this air supplied under pressure increases the pressure within the combustion chamber 12 or supercharges the same to a value indicated by the point 50 on curve 43 at which time the last of the apertures 48 passes across the intake port 15 and the latter is closed by the piston 13. It should also be noted that the apertures 45 are no longer in register with the intake port 15 when supercharging air is supplied so the latter cannot escape to passage 46.

After the intake port 15 has been closed by the piston 13, the compression in the cylinder begins and fuel is injected into the combustion chamber 12 near the inner dead center in the usual manner by a suitable injector 51 and the mixture of air and fuel within the combustion chamber is burned, increasing the pressure therein to a maximum value indicated by the point 52 on curve 43.

The cycle is then repeated and continued as described above. It will be understood that the same cycle is repeated for succeeding cylinders. The turbine rotors 18 and 19 are provided with segmental slots arranged at the same radial distance from the axis of rotation of the rotors as the blades 24 and 25 thereof. These slots are disposed in alinement with the slot 41 in the rotor 17 so that an unobstructed passage is formed simultaneously through all of the turbine rotors for the exhaust gases discharged from the combustion chamber during the scavenging operation described above.

In order that the blades and slots of the turbine rotors may be brought into register with the exhaust ports 16 in predetermined timed relation with the opening and closing of the exhaust port by the piston 13, an arrangement is provided for controlling the speed of rotation of the turbine rotors in timed relation with respect to the rotation of the crank shaft 11. This arrangement is preferably in the form of a positive driving connection between the turbine rotor and the crank shaft in order that any additional power delivered by the turbine and not required for driving the compressor 33 may be utilized for rotation of the crank shaft. In the construction illustrated, the turbine rotors are geared to the crank shaft by a gearing arrangement which includes a gear 53 rigidly secured to the crank shaft 11 and meshing with pinions 54 mounted on jack shafts 55. The shafts 55 are, in turn, journaled in bosses 56 formed on an annular gear casing 57 surrounding the gear connection and rigidly connected to the casing 38 by pins 58. The pinions 54 are rigidly connected to gears 59 meshing with a gear 60 which is rigidly secured to the outer end of the sleeve 20 by a pin 61. For the four cylinder, two cycle engine illustrated, the gear ratio is preferably such that the sleeve 20 and its attached turbine rotors rotate at three times the speed of rotation of the crank shaft 11. An anti-friction bearing 62 is preferably interposed between the gear casing 57 and the outer end portion of the crank shaft 11.

An arrangement has been provided for utilizing the turbine rotor 17 to start the engine. This arrangement preferably includes a plurality of radially extending blades 63 which extend entirely about the periphery of the rotor 17. Compressed air is supplied from a suitable source through a conduit 64 to a recess 65 formed in the side wall of the cylinder 10 and surrounding a portion of the edge of the rotor 17. The compressed air thus directed against the blades 63 causes a rotation of the turbine rotor 17 and consequently, of the crank shaft 11 for starting the engine. The spent starting air may be discharged into the exhaust manifold or as illustrated (Fig. 2) to the atmosphere through a port 65a.

Although I have shown and described a particular embodiment of my invention in connection with two cycle Diesel engines, it should be understood that I do not wish to limit my invention to the particular construction and type of engine described, and I intend in the appended claims to cover all modifications within the spirit and scope of my invention.

I claim as my invention:

1. The combination with an internal combustion engine comprising a cylinder having a piston reciprocable therein and intake and exhaust ports in the walls thereof, said exhaust ports being disposed to be covered and uncovered by said piston, of a rotatably mounted combined turbine and exhaust port timing rotor, said rotor being provided with a segment of turbine blades and an elongated aperture disposed for successive registry with said exhaust port, and means for maintaining the rotation of said rotor in timed relation with the reciprocation of said piston to bring said blades and aperture each sequentially into registry with said exhaust port during the period it is uncovered by said piston.

2. In a two-cycle internal combustion engine the combination of a cylinder having a piston reciprocable therein, said cylinder having intake and exhaust ports therein disposed to be uncovered in the order named by said piston on the power stroke thereof and covered in the reverse order during the compression stroke thereof, means including an apertured timing rotor for closing said ports during portions of the uncovered periods thereof to retain said intake port closed until after said exhaust port is opened during the piston power stroke and to close said exhaust port in advance of its coverage by said piston during the compression stroke thereof, and means for maintaining rotation of said rotor in timed relation with the reciprocation of said piston.

3. The combination with a two-cycle internal combustion engine comprising a cylinder having a piston reciprocable therein and intake and exhaust ports in the walls thereof, said ports being disposed to be successively covered and uncovered by said piston in such manner that said exhaust port is uncovered during only a portion of the open period of said intake port, of a rotatably mounted combined turbine and exhaust port timing rotor, said rotor being provided with a segment of turbine blades and an elongated aperture followed by an imperforate portion all disposed for successive registry in the order named with said exhaust port, means for maintaining the rotation of said rotor in timed relation to the reciprocation of said piston to bring said blades and aperture and imperforate rotor portion sequentially into registry with said exhaust port during the period it is uncovered by said piston, and means for supplying air under pressure to said intake port during at least a portion of the open period thereof to scavenge said cylinder while said aperture is in registry with said exhaust port and to supercharge said cylinder while said exhaust port is closed by said imperforate rotor portion.

4. The combination with a two-cycle internal combustion engine comprising a cylinder having a piston reciprocable therein and intake and exhaust ports in the walls thereof, said ports being disposed to be successively covered and uncovered by said piston in such manner that said exhaust port is uncovered during only a portion of the open period of said intake ports, of a rotatably mounted combined turbine and port timing rotor, said rotor being provided with a segment of turbine blades and an elongated aperture followed by an imperforate portion all disposed for successive registry in the order named with said exhaust port, said rotor also being provided with an imperforate portion disposed for registry with said intake port to close the same while said blades are in registry with said exhaust port and a second aperture disposed for registry with said intake port while said first named aperture registers with said exhaust port, means for maintaining the rotation of said rotor in timed relation to the reciprocation of said piston to bring said blades and first named aperture and imperforate rotor portion sequentially into registry with said exhaust port during the period it is uncovered by said piston, and means for supplying air under pressure to said intake port through said second aperture to scavenge said cylinder while said first named aperture is in registry with said exhaust port and to supercharge said cylinder while said exhaust port is closed by said imperforate rotor portion.

5. In a two-cycle internal combustion engine the combination of a plurality of radially arranged cylinders having pistons reciprocable therein, each of said cylinders having intake and exhaust ports therein disposed to be uncovered in the order named by the associated piston on the power stroke thereof and covered in the reverse order during the compression stroke thereof, means including a single apertured timing rotor cooperating with all of said cylinders for sequentially closing said intake ports during portions of the uncovered periods thereof to retain each of said intake ports closed until after the associated exhaust port is opened during the piston power stroke, means for maintaining the rotation of said rotor in timed relation with the reciprocation of said piston, means for supplying scavenging air under pressure to said intake ports during the periods they are uncovered by said timing rotor and while the associated exhaust port is uncovered by said piston, and means for supplying high pressure air to each of said intake ports for supercharging during the later portion of the periods that said intake ports are uncovered by said timing rotor and the associated exhaust ports are covered by said pistons.

6. In an internal combustion engine the combination of a cylinder and mechanism for reciprocating a piston therein, said cylinder having intake and exhaust ports therein and means operated by said mechanism for opening said ports in the order named during the power stroke of the piston and for closing said ports in the reverse order during the compression stroke thereof, means comprising an apertured timing rotor for closing at least a part of said ports during portions of the periods they are opened by said first mentioned means, and means for maintaining rotation of said rotor in timed relation with said mechanism.

FRITZ P. GRUTZNER.